Patented July 5, 1949

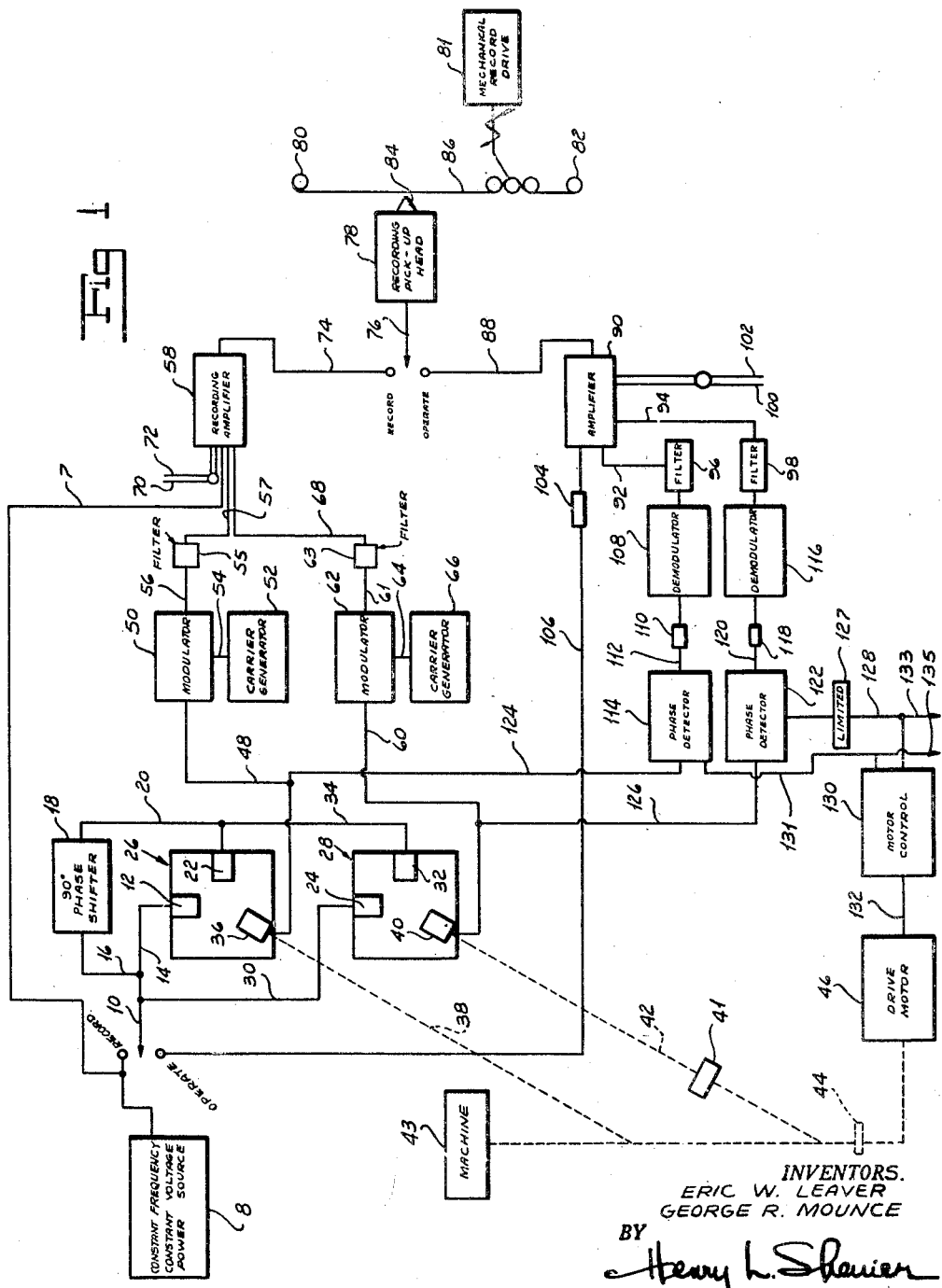

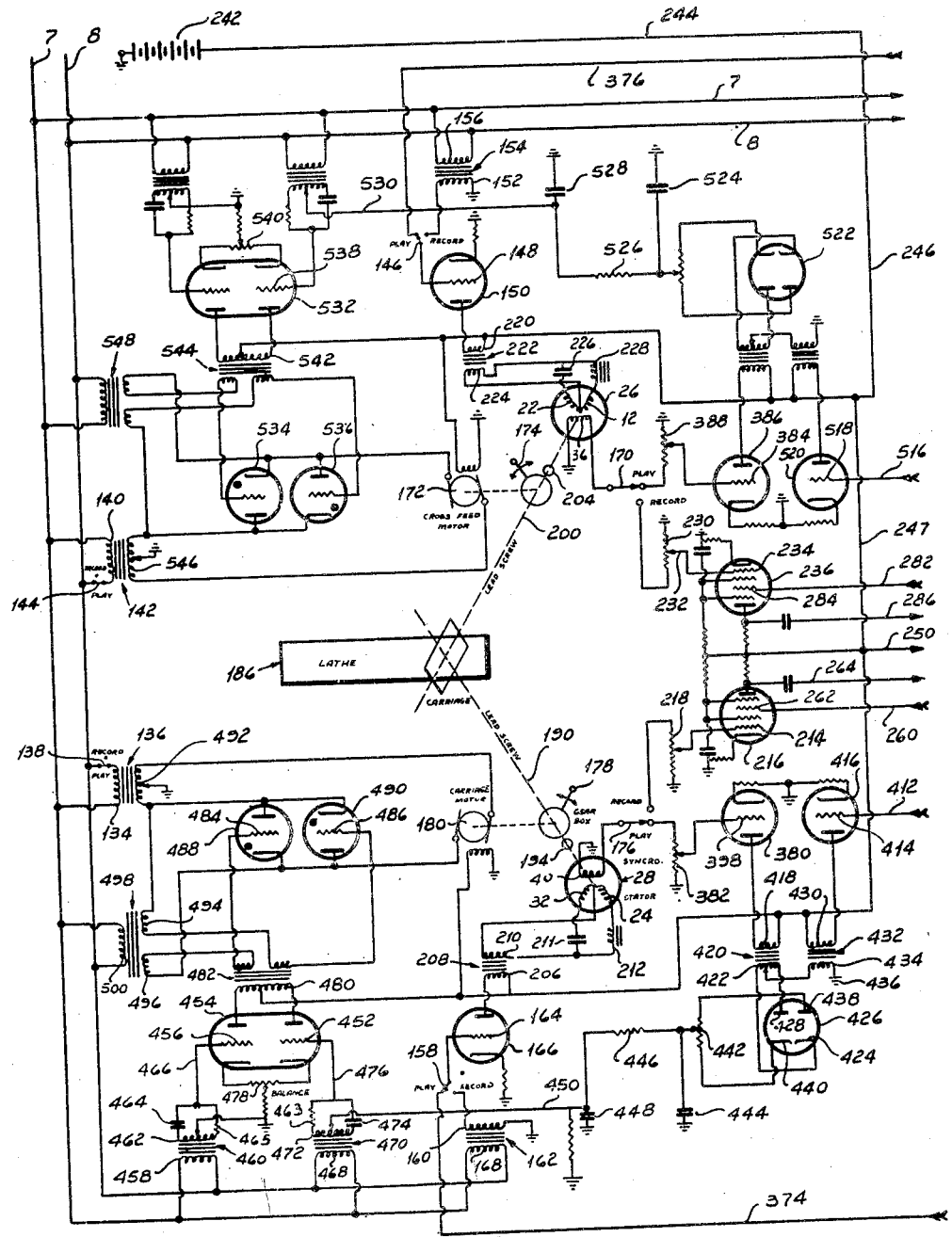

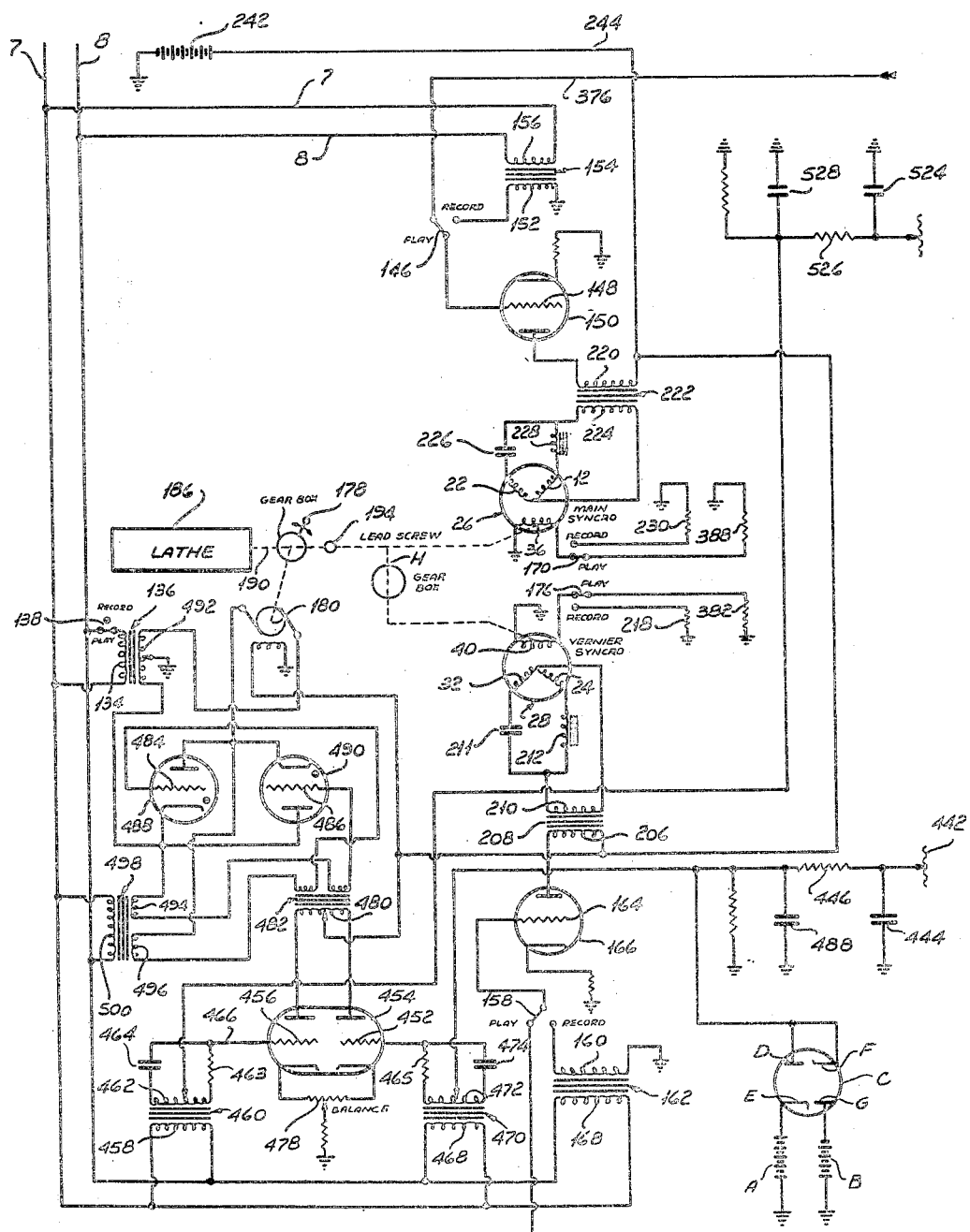

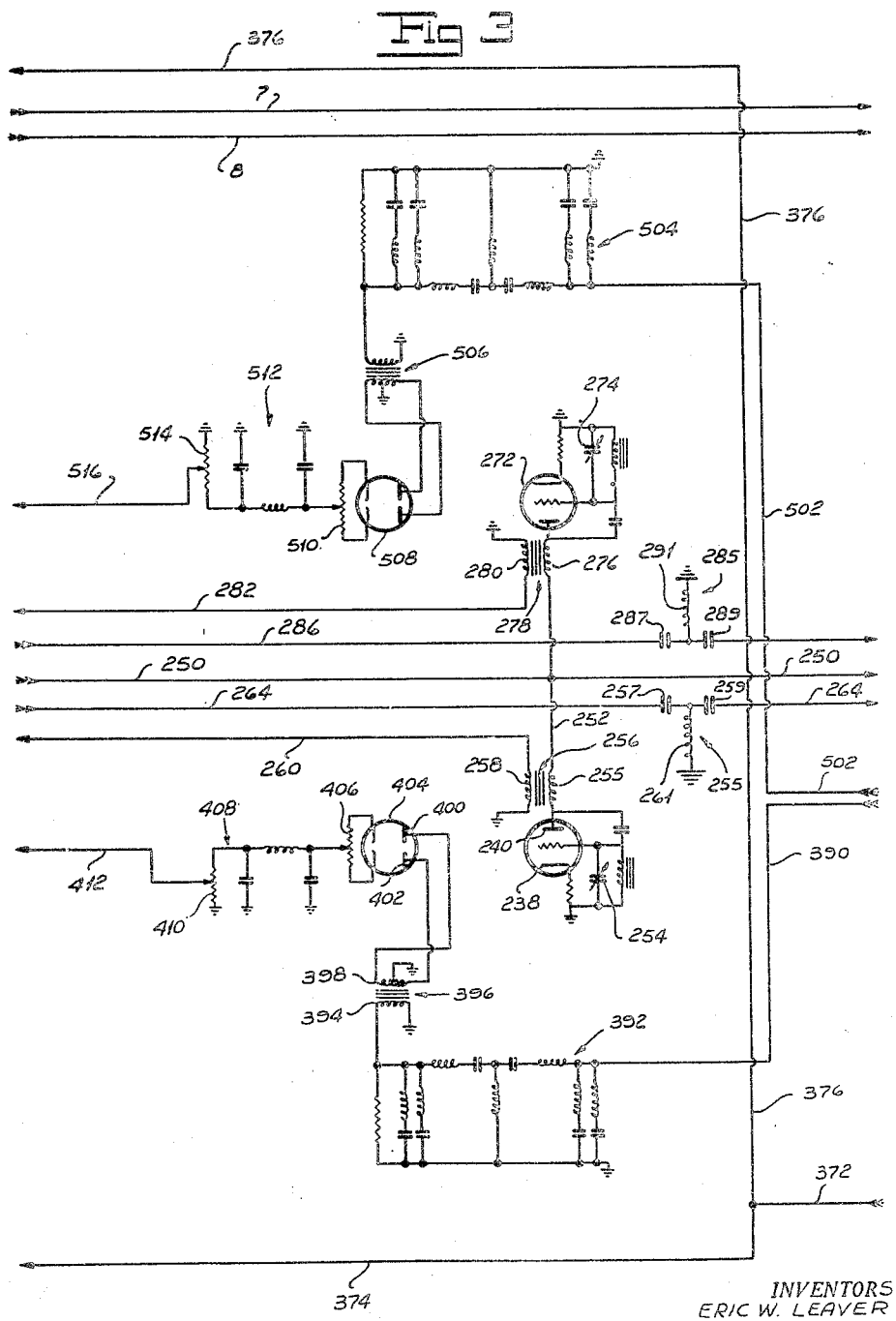

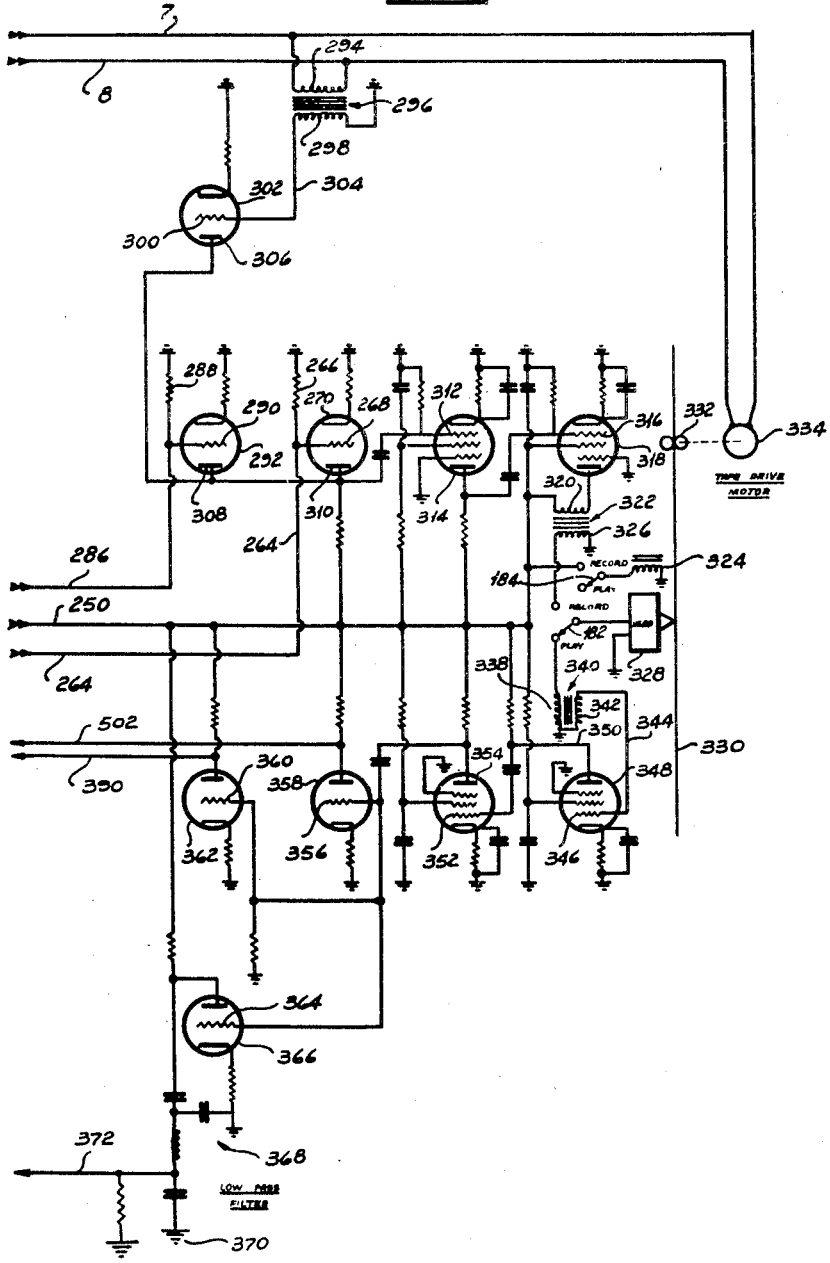

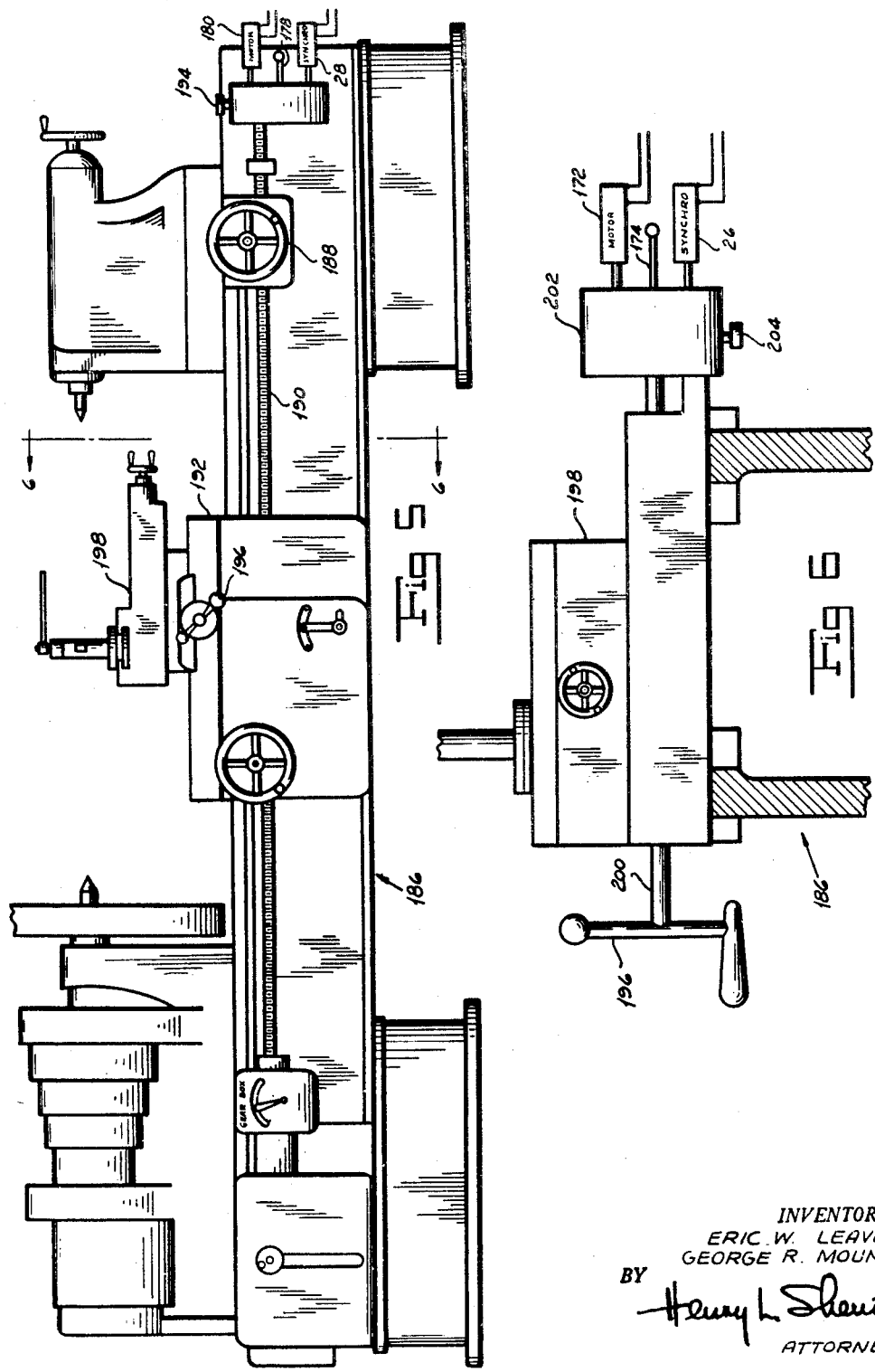

2,475,245

UNITED STATES PATENT OFFICE 2,475,245

METHOD AND APPARATUS FOR THE AUTOMATIC CONTROL OF MACHINERY

Eric W. Leaver and George R. Mounce, Toronto, Ontario, Canada, assignors, by mesne assignments, to Salem Engineering (Canada) Limited, Toronto, Ontario, Canada Application May 1, 1947, Serial No. 745,348

19 Claims. (Cl. 318—162)

Our invention relates to an improved method and apparatus for the automatic control of machinery and more particularly to an improved method and apparatus for operating one or a number of machines of any character in accordance with a predetermined series of operations.

Heretofore it has been proposed to control machine tools such as lathes, milling machines and the like automatically. These controls operate in response to specially cut cams, templets, special arrangements of gears and the like. The manufacture of the special cams, templets and other control devices is exceedingly difficult. Furthermore, their use has been limited to a relatively small number of comparatively simple operations.

One object of our invention is to provide an automatic control method and apparatus for practicing the method in which a machine tool or similar apparatus may be operated in any manner automatically in which it can be operated manually.

Another object of our invention is to provide a method and apparatus for recording the position and velocity of machine parts and machine tools electronically.

Another object of our invention is to provide an automatic control in which machine parts and machine tools may be operated electronically from an antecedently made record.

Another object of our invention is to provide an automatic control for machine parts and machine tools in which a record may be made at one speed, usually slower, and subsequently operated automatically from the record thus made at a different speed, usually higher.

A further object of our invention is to provide a novel method and apparatus for operating machine parts and machine tools in which a record is made by the manual operation of one machine tool or machine part and a plurality of machine tools or machine parts are simultaneously operated from the single record thus made.

Still another object of our invention is to provide a novel method and apparatus in the operation of machines in which sequential operations differing in time and in character may be performed successively from a single record.

Another object of our invention is to provide an improved method and apparatus for controlling machines for performing a series of connected operations from a single record.

Another object of our invention is to provide a method and apparatus in which a phase differential between a recorded standard signal and an information signal is employed as the control.

Further and other objects of our invention will appear from the following description.

In general our invention contemplates the operation of a machine such as a machine tool or the like manually in which all of the movements of the various parts of the machine which are subject to control are recorded upon a record, preferably electronically, whereby the signals preserved on the record represent the sequential or simultaneous movements of one or a plurality of controllable parts or both. The signals furthermore thus preserved represent the direction of movement of the controllable parts and their speed of movement with respect to the phase relation with the same or other movements. We then operat the machine by automatic means controlling the operation in response to the signals preserved by the record, which are converted electronically into control signals adapted to control the movements of prime movers which operate the controllable parts of the machine in exact simultaneous or sequential relation or both to the movements which took place when the machine was operated initially manually.

In this manner we are enabled to employ a highly skilled manual operator to produce parts by machine tools or to perform operations of machines and make an accurate record of all of the operations performed by the skilled manual operator. The record made in this manner is subsequently used to control one or a large number of similar machines to perform in exactly the same manner when operated manually by the skilled operator. Furthermore, by making the record at a slow speed and playing it back at a high speed within the limits of the capacity of the prime movers employed and the machine tools involved, we are enabled to operate a machine tool rapidly and accurately to a degree heretofore impossible either by hand or in any other manner.

In the accompanying drawings which form part of the instant specification and which are to be read in conjunction therewith and in which like reference numerals are used to indicate like parts in the various views:

Figure 1 is a schematic view showing apparatus embodying our invention and capable of carrying out the method of our invention.

Figure 2 is the left-hand portion of a diagrammatic view of apparatus embodying our invention and capable of carrying out the method of our invention.

Figure 2A is a view similar to Figure 2 suitable for a main and vernier channel instead of a two-main channel system as shown in Figure 2.

Figure 3 is a central portion of a diagrammatic view of apparatus embodying our invention and capable of carrying out the method of our invention.

Figure 4 is the right-hand portion of a diagrammatic view of apparatus embodying our invention and capable of carrying out the method of our invention, it being understood that Figures 2, 3 and 4 form a complete diagram.

Figure 5 is an elevation showing a lathe equipped for use in our apparatus and for carrying out the method of our invention.

Figure 6 is a fragmentary sectional view on an enlarged scale taken on the line 6—6 of Figure 5.

More particularly, referring now to Figure 1, voltage from a constant frequency, constant voltage power source 8 is fed to the recording amplifier 58 by cable 7. This voltage is also applied to another portion of the recording system or the operating system by switch 10. Considering the system connected with the switch 10 in the recording position, the voltage from the source 8 is led to one field coil 12 of a device hereafter referred to as a "synchro" which produces a variation in phase of the output voltage with respect to an applied voltage proportional to the rotational position of the rotor and hence the position of parts geared or otherwise connected thereto, indicated generally by the reference numeral 26, by cable 14. Current from the voltage source 8 flows through cable 16 through a phase shifting circuit 18 adapted to shift the phase of the voltage from the source 8 through 90°. The output voltage from the phase shifting circuit 18 is impressed by cable 20 upon another field coil 22 of the synchro stator. In Figure 1 two channels are shown. It is to be understood, of course, that any number of channels may be employed. In Figure 1, one channel is used for the primary movement of parts and the other channel is used for vernier movements. Field coil 24 of a second synchro, indicated generally by the reference numeral 28, is connected to the voltage source by cable 30. The output voltage from the phase shifting circuit 18 is impressed upon the field coil 32 of the stator of the synchro 28 by cable 34. The rotor 36 of the synchro 26 is connected, either directly or through gears, mechanically by the connection indicated by the reference numeral 38, to a movable part of a machine or machine tool. The rotor 40 of the synchro 28 is connected mechanically by a connection indicated diagrammatically by the reference numeral 42 to the same movable part through an appropriate connection for vernier movements such as a gear box of suitable ratio 41. During the making of the record the clutch 44 between the drive motor or motors 46 for the movable parts is disconnected and the machine parts moved manually or by automatic feed. The machine is indicated generally by reference 43. The parts to be moved, it is to be understood, may be manual control elements which in turn control constantly driven prime movers.

The voltage induced in the rotor of a phase with respect to the voltage from the constant voltage constant frequency source 8 depending upon its angular position is led by cable 48 to a modulator 50 into which is fed a carrier signal from carrier signal generator 52 through cable 54. The carrier signal modulated in accordance with the voltage induced in rotor 36 is led by cable 56 to a high pass filter 55 consisting of condensers and inductor. The purpose of the filter is to reject the modulating frequencies and pass only the carrier and its modulations. Then the output voltage is led by conductor 57 to the recording amplifier 58. In a similar manner the signals produced due to the positions of the rotor 40 of the synchro 28 are led by cable 60 to a modulator 62 into which is fed by cable 64 a second carrier signal generated by the generator 66. The second carrier signal modulated in accordance with the voltage induced in the rotor 40 is led by cable 61, through a high pass filter 63, and thence through cable 68 to the recording amplifier 58. Cables 70 and 72 represent additional channels, it being understood that any desired number of channels may be employed, each of which is impressed on a carrier signal having a distinguishably different frequency. The output signals from the recording amplifier are led by cable 74 through cable 76 to the head 78 of the recording device. It is understood of course that cable 76 is switched to the recording position during the making of the record. Any suitable recording device known to the art may be employed. For purposes of illustration and not by way of limitation, we show a wire or tape recorder in which a magnetizable wire or tape is adapted to make a magnetic record. The wire recorder is driven by a drive indicated by the reference numeral 81. The record tape is unreeled from reel 80 and stored upon reel 82. It is to be understood that the record is shown as a tape or wire wound from one spool to the other merely for the purpose of illustration. A continuous record, one which repeats without rewinding, can be used. It passes closely adjacent to the magnetizing tip 84 of the recording head. The carrier waves, generated by the generators 52 and 66, as modulated by the signals responsive to the positions of the rotors 36 and 40 and amplified by the recording amplifier 58, are recorded upon the wire or tape 86.

To operate the machine or machine tool from the record thus made, the switches 10 and 76 are moved to operating position and the clutch 44 is engaged with the drive motor 46. The pick-up head is now connected to receive the record magnetically recorded upon the wire or tape 86 when it is run back by the drive 81, after being rewound upon reel 80. The signals picked up by the head 78 pass through the switch cable 76, through the cable 88 to the amplifier 90. The output signal of the amplifier 90 is led through cables 92 and 94 to filters 96 and 98. If additional channels are employed, cables 100 and 102 lead the output signals from the amplifier 90 to additional filters (not shown). The ouput signals from the amplifier 90, too, pass through a low pass filter 104 which allows only the reference frequency of the source 8 to pass. This signal is impressed through cable 106 directly upon field coils 12 and 24 of the synchros 26 and 28, and after being shifted in phase through 90° by the phase shifter 18 upon field coils 22 and 32. The filter 96 is a band pass filter which allows only the frequency of the carrier generator 52 with its attendant modulation frequencies to pass. The output signal from the filter 96 is demodulated in the demodulator 108 and the demodulated signal passed through a low-pass filter 110 which eliminates the carrier signal. The modulation voltage is fed by cable 112 to a phase detector 114.

The band pass filter 98 upon which signals from amplifier 90 are impressed through conductor 94 is arranged to permit only the signals of the frequency generated by carrier generator 66 with its attendant modulation frequencies to pass. The signal is demodulated in demodulator 116 and the demodulated voltage passed through low-pass filter 118 which eliminates the carrier. The modulation voltage is impressed by cable 120 upon phase detector 122. A signal as a function of position of rotor 36 is impressed by cable 124; also upon phase detector 114. In a similar manner, a signal which is a function of the position of rotor 40 also is impressed by cable 126 upon phase detector 122. The voltage developed by the phase detectors will depend both in magnitude and direction on the phase difference between the modulation voltage and the reference voltage. The voltage from phase detector 114 is fed to the motor control 130 through cable 131. The voltage from phase detector 122 is fed through a limiter 127 and thence by cable 128 to the motor control 130. The output signal from the motor control circuit passes through cable 132 to control the drive motor 46.

It will be observed that in Figure 1 the signal from phase detector 114 is passed directly to the motor control 130 while the signal from phase detector 122 is passed through a limiter indicated by the general reference numeral 127. The purpose of the limiter is to restrict the amplitude of the signal from phase detector 122 which responds to the signal from the vernier synchro 28 to a fraction of the output voltage obtainable from phase detector 114 which receives its signal from the main synchro 26. The result is that the signal from phase detector 114 swamps out the signal from phase detector 122 at all times except when the angular position of the main synchro is nearly identical and the position of the vernier is less than 180° from that required by the information from the record. At this point control of the motor control is taken over by the vernier synchro. This is the type of connection which is employed where motor 36 represents the main movements of a part and rotor 40 represents vernier movements of the same part.

It is to be noted that if the playback is to take place at a different record speed than when recorded, a different phase shift network 18 must be used for playback than for record and the filters 96, 98 and 104 must be designed to operate at the higher or lower frequencies.

Referring to Figure 1, it will be observed that any number of like machines may be operated simultaneously in parallel by having each of these machines equipped with a motor control similar to motor control 130 and feeding the output of the phase detector 114 and the limited output of the phase detector 122 to these additional motor control units, as through cables 133 and 135.

When several channels are used some of them may be used for other machines operating in similar or different manners. In this way the machines will be synchronized.

One or more channels may be used to control a motor circuit or circuits for chuck or other drive speeds, or relay circuits and the like. They may be used for marking the beginning or end of a series of operations.

A plurality of pickup heads together with their associated circuitry may be used to control the same operations at different times or the same or different machines. The heads would be arranged to be energized by the record at different times so that the machine parts or machines would go through the same operations sequentially.

It should be noted that the intent of the invention is not departed from by the control of valves and the like instead of thyratron motor controls. These valves may be used to control air or hydraulic systems and the like.

The reference frequency may also be fed through a modulator and appear on the record as a modulated carrier and during playback be fed through a demodulator for application to the synchro stators.

Referring now to Figures 2 to 6, inclusive, in which we have shown a complete diagram for the control of a simple machine tool such as a lathe, together with figures showing the locations of the synchros and the prime movers upon the lathe, we will describe our method and the operation of our apparatus first in the making of a record. A constant voltage, constant frequency alternating source is impressed across main line conductors 7 and 8. The primary winding 134 of the transformer indicated generally by the reference numeral 136 is de-energized by throwing the switch 138 to the "record" position. As can be seen by reference to Figure 2, the primary winding 140 of the transformer indicated generally by the reference numeral 142 is deenergized by moving the switch 144 to the "record" position. The switch 146 is moved to the "record" position thus connecting the grid 148 of the tube 150 across the output of the secondary winding 152 of the transformer indicated generally by the reference numeral 154. The primary winding 156 of the transformer 154 is connected across the constant voltage, constant frequency source. Similarly, the switch 158 is moved to "record" position thus impressing the output voltage of the secondary winding 160 of the transformer indicated generally by the reference numeral 162 upon the grid 164 of the tube 166. The primary winding 168 of the transformer 162 is energized from the constant voltage, constant frequency source. Switch 170 is moved to the "record" position. The cross feed of the lathe tool is disconnected from the cross feed motor 172 by means of the clutch 174. The switch 176 is moved to "record" position. The carriage motor 180 is disengaged from the carriage by the clutch 178. The switches 182 and 184 shown in Figure 4 are moved into the "record" position.

With the switches as just described, a part to be turned is placed in the lathe indicated generally by the reference numeral 186. The hand wheel 188, shown in Figure 5, is used to operate the carriage screw 190. This moves the carriage 192 to the left and to the right of the bed. Any movements by the carriage screw 190 will rotate the rotor 40 of the synchro 28 so that the longitudinal position of the carriage is always the function of the rotation of the feed screw 190 and hence of the rotor 40 of the synchro 28. A differential adjustment 194 between the lead screw and the rotor is provided. Similarly, the cross feed is operated manually by the operating handle 196, shown in Figures 5 and 6, to move the tool holder 198 to and from the work upon the lathe centers as a function of the rotation of the cross feed screw 200. The rotor 36 of the synchro 26 is always connected through the gear box 202 so that the position of the rotor will always be a function of the position of the cross feed screw 200 and hence of the position of the tool holder 198. A differential adjusting means 204 is provided between the lead screw 200 and the rotor 36. This adjusting means may be incorporated in the gear box 202.

The reference voltage from wires 7 and 8 is applied through transformer 162 to the amplifier tube 166. The plate current of tube 166 is passed through the primary winding 206 of a transformer, indicated generally by the reference numeral 208. The secondary winding 210 of the transformer 208 is connected across the field coils 24 and 32 of the stator of synchro 28 through two phase shifting networks comprising capacitor 211 and inductor 212. In this manner the voltage appearing across field winding 32 of the synchro 28 will be 90° out of phase with the voltage appearing across the winding 24. As the carriage screw 190 is rotated by the operator, the rotor 40 of the synchro 28 will be rotated in synchronism and a voltage will be induced in the rotor winding 40 of the synchro 28 having a phase relationship depending upon its orientation in the synchro 28. This orientation may be adjusted through the differential adjustment 194. The voltage generated across the rotor winding 40 is impressed upon the control grid 214 of the modulator tube 216 from voltage dividing resistor 218.

The output of the secondary winding 152 of the transformer 154 is applied to the grid 148 of the amplifier tube 150 whereby there appears across the primary winding 220 of the transformer, indicated generally by the reference numeral 222, the amplified voltage of the constant frequency, constant voltage power source impressed across conductors 7 and 8. The secondary winding 224 of the transformer 222 is connected across the stator coils 12 and 22 of the synchro 26 through phase shifting network comprising capacitor 226 and inductor 228. The parameters of the phase shifting network are such that the voltage appearing across stator winding 22 of the synchro 26 is 90° out of phase with the voltage appearing across the winding 12 of the synchro stator. The rotor winding 36 of the synchro 26 follows the position of the cross feed lead screw 200. There will thus be induced across the rotor winding 36 of the synchro a voltage which is a function of the position of the tool controlled by the cross feed of the lathe. The orientation of the rotor can be adjusted by the differential adjustment 204. The voltage generated across rotor coil 36 is impressed across a voltage dividing resistor 230. A movable contact 232 is adapted to conduct a voltage from the voltage divider 230 to the control grid 234 of the modulator tube 236.

Referring now to Figure 3, a thermionic tube 238 is connected as a generator. A plate voltage to its anode 240 is supplied from the battery 242, Figure 2, through conductor 244, through conductor 246, through conductor 247, through conductor 250, Figure 2 and Figure 3, and conductor 252. It will be observed that all of the plates of all of the tubes are supplied by connections to the battery through conductor 246, where the plate voltage is not supplied through transformers from the constant voltage, constant frequency source. The tuning of the oscillating circuit by means of capacitor 254 is such as to generate a carrier wave having a predetermined frequency. This carrier signal passes through the primary winding 255 of a transformer indicated generally by the reference numeral 256. The voltage appearing across the secondary winding 258 of the transformer 256 is impressed by the conductor 260 upon the mixer grid 262 of the thermionic tube 216, Figure 2. The output signal of tube 216 which is the carrier wave generated by the oscillator tube 238, as modulated by the voltage appearing across rotor winding 40, is led by conductor 264 to high pass filter indicated generally by the reference numeral 255 consisting of condensers 257 and 259 and inductor 261. The purpose of the filter is to reject the modulating frequencies and pass only the carrier and its modulations. The output voltage is then led by conductor 264 across the resistor 266, shown in Figure 4. The voltage across resistor 266 is impressed upon the grid 268 of the mixer tube 270.

Referring again to Figure 3, a thermionic tube 272 is connected as an oscillator in a circuit tuned by capacitor 274 to generate a carrier wave which differs distinguishably from the carrier wave generated by the tube 238. The signal generated by the tube and its associated circuit passes through the primary winding 276 of a transformer indicated generally by the reference numeral 278. A voltage appearing across the secondary winding 280 of the transformer 278 is impressed by conductor 282 upon the mixer grid 284 of the thermionic tube 236, Figure 2. The output signal of the tube 236 will be the carrier wave generated by the tube 272 as modulated by the voltage appearing across the rotor winding 36 of the synchro 26. This output signal is impressed by conductor 286 to high pass filter indicated generally by the reference numeral 285 consisting of condensers 287 and 289 and inductor 291. The purpose of the filter is to reject the modulating frequencies and pass only the carrier and its modulations. The output voltage is then led by conductor 286 across the resistor 288, shown in Figure 4. The voltage across resistor 288 is impressed upon the grid 290 of mixer tube 292. The voltage from the constant voltage, constant frequency source main line wires 7 and 8 is impressed across the primary winding 294 of a transformer indicated generally by the reference numeral 296. The voltage appearing across the secondary winding 298 is led to the grid 300 of a thermionic tube 302 by the conductor 304. The anode 306 of the tube 302, the anode 308 of the tube 292 and the anode 310 of the tube 270 are connected in common to the grid 312 of the recording amplifier tube 314. The output signal of the tube 413 is applied to the grid 316 of a second amplifier tube 318. The amplified output of tube 318 is impressed across the primary winding 320 of a transformer indicated generally by the reference numeral 322. The polarizing winding 324 is connected by a switch 184 for the record condition to the source of D. C. on conductor 250. The secondary winding 326 of the transformer 322 is connected to the recording head 328 of the recorder so that tape or wire 330 which is being driven by driving rolls 332 by tape drive motor 334 may receive a record in the form of differentially magnetized portions in which the magnetization is a function of the impressed signal as to amplitude, frequency and phase, as is well known in the art of wire recorders.

The carrier frequency generated by the tube 238 and its asscciated circuit and the carrier frequency generated by tube 272 and its associated circuit not only differ from each other distinguishably; that is, sufficiently to permit separation by suitable filters upon the subsequent playback, but also differ from the frequency of the constant voltage source appearing across main line wires 7 and 8.

It will be seen that the record thus made is one of the constant voltage, constant frequency source, and a plurality of carrier frequencies each of which is modulated in accordance with a voltage which is the function of the movements of a machine part or the control for a machine part. While we have illustrated only two channels, it is to be understood that any desired number of channels may be recorded as long as each carrier frequency is distinguishable by the means of filters from each other carrier frequency and from the frequency of the constant voltage, constant frequency source.

The record having been made may be played back to control the machine tool from which the record was made or a plurality of like machine tools connected in parallel. Switches 146 and 158 are moved from "record" to "play" position. Switch 144 is moved from "record" to "play" position thus energizing the primary winding 140 of a transformer indicated generally by reference numeral 142. Switch 138 is moved to "play" position thus energizing the primary winding 134 of a transformer indicated generally by the reference numeral 136. Switches 170 and 176 are likewise moved from "record" to "play" position. Clutch levers 174 and 178 are moved to engaging positions thus connecting motors 172 and 180 to drive screws 200 and 190. Switches 182 and 184 are moved to "play" positions. When the record tape 330 passes the head 328 the magnetized tape will generate voltages in the head proportional to the signals which created the magnetized arrangement in the tape. The voltages are impressed across the primary winding 338 of a transformer indicated generally by the reference numeral 340. The voltages appearing across the secondary winding 342 of the transformer 340 are impressed by conductor 344 upon the grid 346 of amplifier tube 348. The output signal from the amplifier tube 348 is impressed by conductor 350 upon the grid 352 of the amplifier tube 354. The output signal from the tube 354 is impressed upon the grid 356 of the coupling amplifier tube 358, upon the grid 360 of the coupling amplifier tube 362 and upon the grid 364 of the coupling amplifier tube 366, as can be seen by reference to Figure 4. The output signal of tube 366 is passed through a low pass filter, indicated generally by the reference numeral 368, which is designed to permit the passage of the reference frequency only, so that the components of the signal comprising the modulated carrier waves are rejected by the filter 368. An amplified voltage at the frequency of the source across main lines 7 and 8 is communicated through conductor 372 to conductors 374 and 376, to the grids 164 and 148 of amplifier tubes 166 and 150, respectively. The amplified reference frequency therefore is communicated to the stator windings 24 and 32 of synchro 28 through transformer 208, through the phase shifting network. Similarly, a voltage at the reference frequency is impressed by tube 150 and transformer 222 through the phase shifting network across the windings 12 and 22 of the synchro 26. The voltage which is induced across rotor 40 by the stator windings 24 and 32, has a phase relation with respect to the reference frequency, depending upon the orientation of the rotor 40 with respect to the stator windings 24 and 32. This voltage is fed to the grid 398 of tube 380 from voltage dividing resistor 382. Likewise, the voltage which is induced in the rotor 36 from the currents flowing through the field windings 12 and 22, which has a phase relationship with respect to the reference frequency, depending upon the orientation of the rotor 36 with respect to the stator windings 12 and 22. The voltage across rotor winding 36 is fed to the grid 384 of the tube 386 from a voltage dividing resistor 388.

At the same time the output signal from the amplifier tube 362 is fed by conductor 390 to a band pass filter indicated generally by the reference numeral 392. This filter is designed to pass frequencies of the carrier wave generated by the oscillator 238 and its associated circuit. The output of the band pass filter is impressed across the primary winding 394 of a transformer indicated generally by the reference numeral 396. The secondary winding 398 is center tapped to ground, the ends of the secondary winding 398 being connected respectively to the anodes 400 and 402 of a demodulator tube 404. The output of the demodulator tube 404 appears between the center tap of resistor 406 and ground from which it is fed through a low pass filter indicated generally by the reference numeral 408. The filter 408 is designed to reject the carrier frequency of oscillator 238 so that the output signal of the low-pass filter appearing across resistor 410 is an exact function of the modulation voltage theretofore impressed upon the carrier in the making of the record. This modulation voltage is fed by conductor 412 to the grid 414 of a tube 416. It will be observed that tube 380 produces a signal as a function of the actual position of the rotor 40 while the tube 416 produces a signal as a function of the desired position of the rotor and both these signals are fed to the phase detector. The output of tube 380 is impressed across the primary winding 418 of a transformer, indicated generally by the reference numeral 420. The output of tube 416 is connected across the primary winding 430 of a transformer, indicated generally by the reference numeral 432. The midpoint of secondary winding 422 of the transformer 420 is connected through the secondary winding 434 of the transformer 432 to ground 436. One end of the mid-tap secondary winding 422 is connected to the anode 428 of the tube 426; the other end of the mid-tap secondary winding 422 is connected to the cathode 424 of the tube 426. The anode 438 of tube 426 and the cathode 440 are connected across a voltage dividing resistor 442 so that there is developed across the capacitor 444 a voltage which is proportional both in magnitude and direction to the phase difference between the modulation voltage as represented by the output of tube 416 and the reference voltage as represented gnerally by the position of the rotor 40 as represented by the output of the tube 380. The resistor 446 and the capacitor 448 constitute a ripple filter for this voltage. The filtered voltage is fed by conductor 450 to the grid 452 of the tube 454. The tube 454 has applied to its grid 452 and its grid 456 alternating voltages which are 90° out of phase with the line voltage. As will be seen by reference to Figure 2, the primary winding 458 of the transformer, indicated generally by the reference numeral 460, is connected across the main line wires 7 and 8. The output of the secondary winding 462 is shifted in phase by a phase shifting network comprising the capacitor 464 and resistor 463 and applied by conductor 466 to the grid 546. Similarly, the primary winding 468 of a transformer indicated generally by the reference numeral 470 is connected across the main line wires 7 and 8. The output of the secondary winding 472 of the transformer 470 is applied through a phase shifting network comprising the capacitor 474 and resistor 465 to the grid 452 through the conductor 476. When the direct current voltage from the phase detecting circuit, comprising tubes 380, 416 and 426, is zero, the voltage dividing resistor 478 is adjusted so that the voltage appearing across the primary winding 480 of the output transformer, indicated generally by reference numeral 482, is zero. Whenever a positive voltage appears across the capacitor 448, one side of the tube 454 will conduct more current than the other, so that a voltage will appear across the primary winding 480 of the transformer 482. When this occurs, an alternating current voltage will be applied to the grids 484 and 486 of the thyratrons 488 and 490. The phase of these voltages depends on whether the direct current voltage applied to the tube 454 was positive or negative; that is to say, whether it leads or lags by 90° with respect to the plate voltages of the thyratron tubes 488 and 490. The thyratrons 488 and 490 have their plates and their cathode structures connected across the secondary winding 492 of the transformer 136 through the armature of the motor 180. In addition to the voltages applied to the grids 484 and 486 from the transformer 482, we apply bias voltages from the secondaries 494 and 496 of the transformer indicated generally by the reference numeral 498, the primary winding of which, 500, is connected across the main line wires 7 and 8. These bias voltages are 180° out of phase with the voltages applied to the anodes of the thyratrons. When there is no voltage applied from the transformer 482 to the grids of the thyratrons, neither thyratron fires and the motor 180 is stationary. When positive voltage is applied from the phase detector, one thyratron will fire and the motor will rotate in one direction. If the voltage from the phase detector is negative, the other thyratron will fire and the motor will rotate in the opposite direction. The amount of voltage determines the portion of the cycle over which the thyratron will conduct and hence governs the motor speed. The motor is connected so that its motion will move the rotor 40 in a direction which will reduce the voltage applied to the thyratron motor circuit to zero, and hence position the rotor of the synchro, and accordingly the position of the part controlled will vary with the variation in phase difference between the modulation of the signal fed into tube 404 with respect to the reference frequency which is fed into tube 166.

The output of tube 358 in Figure 4 is fed by conductor 502 to a band pass filter indicated generally by the reference numeral 504. This filter is designed to pass only the modulated carrier of the frequency generated by the oscillator 272 and its associated circuit. The output of the band pass filter 504 is fed through the transformer indicated generally by the reference numeral 506 to the demodulator tube 508 similar to tube 404. The output of the demodulator tube 508 appearing between the center tap of resistor 510 and ground is fed through a low-pass filter, indicated generally by reference numeral 512, which is designed to eliminate the carrier wave. The modulation voltage appearing across resistor 514 is fed by conductor 516 to the grid 518 of the tube 520. The cumulative output of tubes 386 and 520 is fed to the tube 522, similar to the tube 426. The output of the phase detector appearing across the capacitor 524 is proportional both in magnitude and direction to the phase difference between the modulation voltage and the reference voltage fed respectively to the grids 518 and 384 of tubes 520 and 386 of the phase detecting network. The resistor 526 and the capacitor 528 form a ripple filter. The voltage aappearing across capacitor 528 is applied by conductor 530 to the motor control circuit comprising tube 532 and thyratrons 534 and 536. The tube 532 has alternating voltages applied to its grids which are 90° out of phase with the line voltage. The resistor 540 is adjusted so when the voltage across capacitor 528 is zero, the voltage appearing across the primary winding 542 of the transformer, indicated generally by the reference numeral 544, will be zero. Whenever a voltage appears across capacitor 524, one side of tube 532 will conduct more current than the other so that a voltage is produced across primary winding 542 and hence an alternating current voltage is applied to the grids of the thyratrons 534 and 536. The phase of these voltages depends on whether the direct current voltage applied to the grid 538 of the tube 532 was positive or negative; that is, 90° leading or lagging with respect to plate voltages of tubes 534 and 536. Thyratrons 534 and 536 have alternating voltage applied to their plate and cathode structures from the secondary winding 546 of the transformer 142 through the armature of the motor 172. In addition to the voltages mentioned which are applied to the grids of the thyratrons from transformer 554, there are bias voltages applied to the grids through the transformer indicated generally by the reference numeral 548. These alternating current bias voltages are 180° out of phase with the voltages applied to the anodes of the thyratrons. When there is no voltage applied by the transformer 544 to the grids of the thyratrons, neither thyratron will fire and the motor 172 is stationary. When positive voltage is applied from the phase detecting network, one thyratron will fire and the motor 172 will rotate in one direction. When the voltage is negative the motor armature 172 will rotate in the other direction. The amount of the voltage determines the portion of the cycle over which the thyratron 534 or 536 will conduct, and hence the speed of the motor 172. The motor 172 is connected to the rotor 36 of the synchro 26. The system is such that the motor 172 will revolve in a direction which will reduce the voltage applied to the thyratron motor circuit to zero, and hence the position of the rotor 36 and the position of the part controlled by the motor 172, in this case the position of the tool, will vary with the variation in phase difference between the modulation of the signal fed into the demodulator tube 508 with respect to the reference frequency fed into tube 150.

It will be seen that the carriage motor will follow the difference in phase between the modulation of its carrier and the reference frequency fed to tube 166. Likewise, the cross feed motor will follow the difference in phase between the modulation of its carrier and the reference frequency fed to tube 150. In this way, the tool is made to follow the motions producing the original recording and the reproduction will be accurate with respect to time and position.

Referring now to Figure 2A in which are illustrated the changes necessary to make the circuit shown in Figure 2 suitable for a main and vernier channel instead of the two-main channel system illustrated in that figure, we find the main differences are:

(a) The elimination of one motor control circuit comprising tubes 534, 536 and 532 and associated circuitry as now two channels are required to operate the single motor control circuit;

(b) The connection of the vernier synchro to the same shaft as the main but through a gear box H;

(c) The connection of wire 530 to the center tap of transformer 460 rather than the transformer in the eliminated thyratron control circuit 534, 536,532 and associated circuitry;

(d) The addition of a limiter tube C and associated batteries A and B shunting condenser 488.

The differences in operation are as follows: In the arrangement previously described, the output from phase detector 522 controlled thyratron motor circuit 532, 534, 536 and hence the cross feed motor. In the Figure 2A it is arranged to aid in the control of the carriage motor 180. It does this in the following manner:

The D. C. voltage from phase detector 522 which depends on the position of the rotor 36 of the main synchro is fed to the center tap of the secondary winding 462 of transformer 460.

The D. C. voltage from phase detector 426 which depends on the position of the rotor 40 of the vernier synchro is limited by the thermionic tube C and associated batteries A and B to a value small compared to the maximum value of the output of phase detector 522. This voltage is fed to the center tap of transformer 470.

If the position of the machine part is considerably different than that required, the output of phase detector 522 will be large, the output of phase detector 426 will be its limited value and hence the output of 522 will control the motor circuit, the output of 426 will have negligible effect and the error will be reduced by the action of the motor in changing the position of rotor 36.

When the part has almost reached the desired position the output of phase detector 522 will be small while due to the gearing up of the vernier synchro the output of phase detector 426 will be large. Hence now phase detector 426 will assume control and due to the compensating action of the circuit will reduce the error in positioning to that allowed by the vernier or the reciprocal of the gearing up ratio of the error allowed by the main synchro. The battery voltages of A and B are adjusted so that the vernier synchro takes control when the machine part assumes a position such that the vernier synchro error is just less than 180° of the vernier synchro rotor's proper rotational position.

It should be observed that while the thyratron circuits are shown in the drawings as connected to the constant voltage constant frequency source, that this is not essential to the operation and in practice a separate source may be desirable.

In the making of the record, the diameter of the stock following the initial cut is accurately measured. In fabricating parts from the record the diameter of the stock following the initial cut should equal that from which the record was made. If the diameter differs, an adjustment can be made through the differentials 204 and 194. In this manner the lathe may be adjusted to cut the stock to the same dimensions that exist in the making of the record.

It will be understood that we have described our invention with respect to the control of a lathe for purposes of illustration only and not by way of limitation. Any operation or series of operations comprising one or a plurality of simultaneous or successive motions may be accurately recorded and accurately reproduced by our method and by means of our apparatus. The record may be made at a slow speed and may be played back at a higher speed. The output signals from the phase detectors may be used to control a plurality of motor control circuits connected in parallel, whereby a large number of machines of like character may be controlled from a single record.

It will be seen that we have accomplished the objects of our invention. We have provided a method for the automatic control of machine tools or the like and apparatus for carrying out the method in which one or a number of like machine tools in parallel may be operated from a single record. We have provided an improved method and apparatus for recording the position and velocity of machine parts and machine tools electronically, from which record machine parts and machine tools used in making the record or like machine parts and machine tools may be operated electronically. We have provided a method and apparatus in which a record may be made at a slow speed, which record may be later used automatically to control machine tools at a higher speed. We have provided a method and apparatus in which a machine part or machine tool may be operated manually automatically to make a record, which record may be subsequently employed to operate the machine tool or a plurality of like machine tools. We have provided an improved method and aparratus for the operation of machines in which sequential operations differing in time and character may be performed successively from a single record. In our method, the phase differential upon a recorded standard signal and an information signal is used to control one or a plurality of machine tools with accuracy and precision.

It will be understood that certain features and sub-combinations are of utility and may be employed without reference to other features and sub-combinations. This is contemplated by and is within the scope of the claims. It is further obvious that various changes may be made in details within the scope of the claims without departing from the spirit of the invention. It is, therefore, to be understood that this invention is not to be limited to the specific details shown and described.

Having thus described our invention, we claim:

1. In a method of automatically controlling machinery, the steps of generating a standard signal of constant frequency and amplitude, generating a control signal from said standard signal as a function of the movement of a machine part, generating a carrier signal differing in frequency from said standard signal, modulating said carrier signal by said control signal and recording said modulated carrier signal.

2. In a method of automatically controlling machinery, the steps of generating a standard signal of constant frequency and amplitude, generating a control signal from said standard signal as a function of the movement of a machine part, generating a carrier signal differing in frequency from said standard signal, modulating said carrier signal by said control signal, amplifying said modulated carrier signal and recording said amplified modulated carrier signal.

3. In a method of automatically controlling machinery, the steps of generating a standard signal of constant frequency and amplitude, generating a control signal from said standard signal as a function of the movement of a machine part, generating a carrier signal differing in frequency from said standard signal, modulating said carrier signal by said control signal, amplifying said modulated carrier signal, and magnetically recording said amplified modulated carrier signal upon an elongated magnetizable metal member.

4. In a method of automatically controlling machinery, the steps of generating a signal as a function of the phase difference between a control signal and an information signal, controlling the movement of a machine part in response to said phase difference signal and varying the phase difference between said information and control signals in response to the movement of the machine part being controlled.

5. A method as in claim 4 in which said control signal is generated from a record.

6. A method as in claim 4 in which said information signal is generated from a recorded standard signal in response to the movement of a machine part.

7. A method as in claim 4 in which said control signal is generated from a record and said information signal is generated in response to the movement of a machine part from a standard signal recorded on the same record.

8. A method of automatically controlling machinery, including the steps of generating a standard signal of constant frequency and amplitude, generating a control signal from said standard signal as a function of the movement of a machine part, generating a carrier signal differing in frequency from said standard signal, modulating said carrier signal by said control signal, recording said modulated carrier signal, recording said standard signal on the same record, then generating a composite signal from the record thus made, filtering a reproduced standard signal from the record, filtering a reproduced modulated carrier signal from the record, demodulating the recorded carrier signal to obtain a control signal, generating an information signal from said recorded standard signal as a function of the position of a machine part and controlling the movement of said machine part as a function of the phase difference between said control signal and said information signal.

9. A method of automatically controlling machinery including the steps of generating a standard signal of constant frequency amplitude, generating a control signal from said standard signal as a function of the movement of a machine part, generating a carrier signal differing in frequency from said standard signal, modulating said carrier signal by said control signal, amplifying said modulated carrier signal, amplifying said standard signal, recording both said amplified modulated carrier signal and said amplified standard signal upon a record, then generating a composite signal from said record, amplifying said composite signal, filtering the standard signal from said amplified composite signal, generating an information signal from said amplified standard signal as a function of the position of a machine part, filtering a modulated carrier signal from said amplified composite signal, demodulating said modulated carrier signal to obtain a control signal, generating a governing signal as a function of the phase difference between said information signal and said control signal and moving a machine part in response to said actuating signal.

10. A method as in claim 9 in which said machine part is moved by a prime mover and controlling said prime mover by a thyratron in response to said actuating signal.

11. In an apparatus for automatically controlling machinery, the combination including a synchronous generator having a pair of field coils and a rotor coil, means for energizing said field coils from a constant frequency, constant amplitude electric energy source, a phase shifting circuit between said source and said field coils whereby to shift the phase of the voltage in one of said coils 90° with respect to the voltage in the other of said coils, means for connecting said rotor coil to a machine part whereby its position will be a function of the position of the machine part, means for generating a carrier signal having a frequency differing from said constant frequency, constant amplitude source, a modulating circuit, means for feeding the output voltage of said rotor coil to said modulating circuit, means for feeding the output of said carrier generator to said modulating circuit whereby to modulate said carrier wave in response to the voltage of said rotor coil, means for amplifying said modulated carrier wave, means for amplifying the signal of said constant frequency, constant amplitude source and means for magnetically recording upon a common record both the amplified constant frequency, constant amplitude signal and said modulated carrier signal.

12. Apparatus as in claim 11 including in combination a second synchronous generator having a second pair of field coils and a second rotor, means for connecting said second rotor to another machine part of the same machine, a second carrier generator for generating a carrier wave differing in frequency both from said first carrier wave and said constant frequency, constant voltage signal and a second modulator circuit, means for feeding said second carrier wave to said second modulator for modulating said second carrier wave in response to the signal generated across said second rotor coil and means for feeding said second modulated carrier wave to said amplifier.

13. Apparatus as in claim 11 including in combination a second synchronous generator having a second pair of field coils and a second rotor, means for connecting said second rotor to said same machine part through a connection having a different mechanical advantage whereby mechanically to amplify the machine part movements, a second carrier generator for generating a carrier wave differing in frequency both from said constant frequency, constant voltage signal and said first carrier signal, a second modulating circuit, means for feeding said second carrier wave to said second modulator circuit, means for feeding the signal generated in said second rotor coil to said modulator circuit whereby to produce a second carrier signal modulated in accordance with the signal in said second rotor and means for feeding said second modulated carrier wave to said amplifier.

14. An automatic control for machinery, including in combination means for generating a signal from a record having recorded thereon a signal of constant frequency and constant amplitude and a modulated carrier signal of a frequency differing from said constant frequency, constant amplitude signal, means for amplifying said reproduced composite signal, a filter tuned to pass said constant frequency constant amplitude signal, a synchronous generator having a pair of field coils and a rotor coil, means for connecting said rotor coil to a machine part for movement thereby, connections for impressing the output signal of said filter across said field coils, a second filter tuned to pass said modulated carrier signal, a demodulator, means for impressing the output signal of said second filter upon said demodulator, a pair of thermionic tubes, means for impressing the signal generated across said rotor coil upon the grid of one of said thermionic tubes, a third filter designed to reject the carrier signal, means for impressing the output of said third filter upon the grid of the other thermionic tube, a phase detecting network, means for impressing the output signals of said thermionic tubes on the phase detecting network, a prime mover for moving said machine part, a control circuit for controlling the movement of said prime mover and means for impressing the output signal of said phase detecting network upon said control circuit.

15. Apparatus as in claim 14 in which said connections for impressing the output signal of said filter across said field coils includes a phase shifting network adapted to shift the phase of the voltage across one of said field coils 90° with respect to the other of said field coils.

16. Apparatus as in claim 14 in which said control circuit for said prime mover includes a thermionic tube having a pair of grids and a pair of anodes, means for impressing a reference signal on one of said grids, means for impressing the output of said phase detecting network upon the other of said grids.

17. Apparatus as in claim 14 in which said control circuit for said prime mover includes a thermionic tube having a pair of grids and a pair of anodes, means for impressing a reference signal on one of said grids, means for impressing the output of said phase detecting network upon the other of said grids, said prime mover comprising an electric motor, a pair of thyratrons having their cathode-anode structures connected in the armature circuit of said motor, a transformer having its primary winding connected across the anodes of said control tube, a pair of secondary windings inductably coupled to the primary winding of said transformer and means for impressing the output of said secondary windings upon respective grids of said thyratrons.

18. As an article of manufacture, an elongated magnetized metal strip having magnetically recorded thereon an amplified signal of constant frequency and constant amplitude, together with a carrier signal of a frequency differing from said constant frequency signal, said carrier signal modulated as a function of the movements of a machine part.

19. In an apparatus for automatically controlling machinery, the combination including a synchronous generator having field coils and a rotor coil, means for energizing said field coils from a constant frequency, constant amplitude electric energy source, a phase shifting circuit between said source and said field coils whereby to shift the phase of the voltage in one of said coils with respect to the voltage of another of said coils, means connecting said rotor coil to a machine part whereby its position will be a function of the position of the machine part, means for generating a carrier signal having a frequency differing from said constant frequency, constant amplitude source, a modulating circuit, means for feeding the output voltage of said rotor coil to said modulating circuit, means for feeding the output of said carrier generator to said modulating circuit whereby to modulate said carrier wave in response to the voltage of said rotor coil, means for amplifying said modulated carrier wave, means for amplifying the signal of said constant frequency, constant amplitude source and means for recording upon a common record both the amplified constant frequency, constant amplitude signal and said modulated carrier signal.

ERIC W. LEAVER.
GEORGE R. MOUNCE.

REFERENCES CITED

The following references are of record in the file of this patent:

UNITED STATES PATENTS

| Number | Name | Date |
|---|---|---|
| 2,172,313 | Young | Sept. 5, 1939 |
| 2,213,108 | Pollard | Aug. 27, 1940 |
| 2,261,644 | Cockrell | Nov. 4, 1941 |